UNITED STATES PATENT OFFICE.

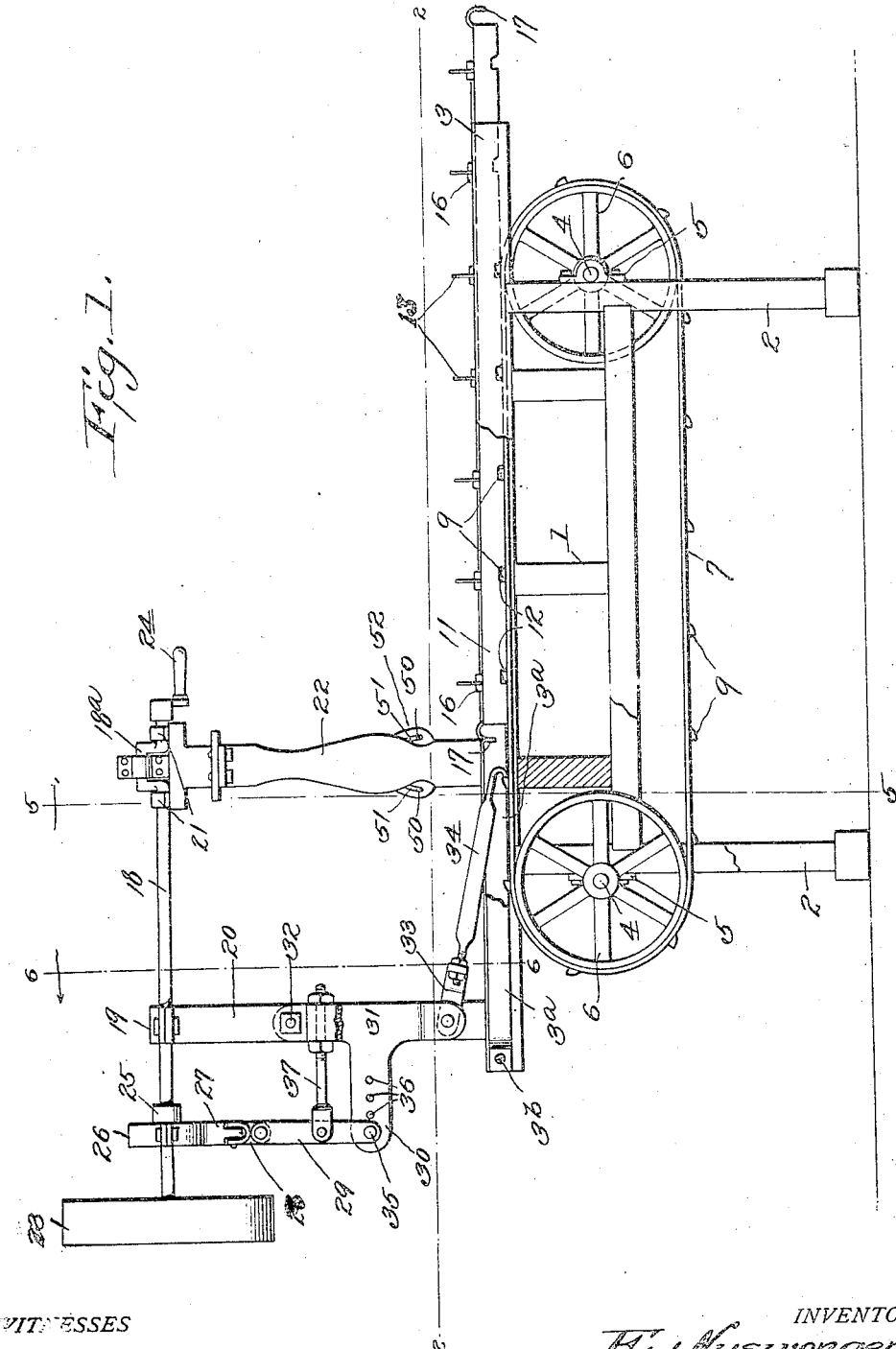

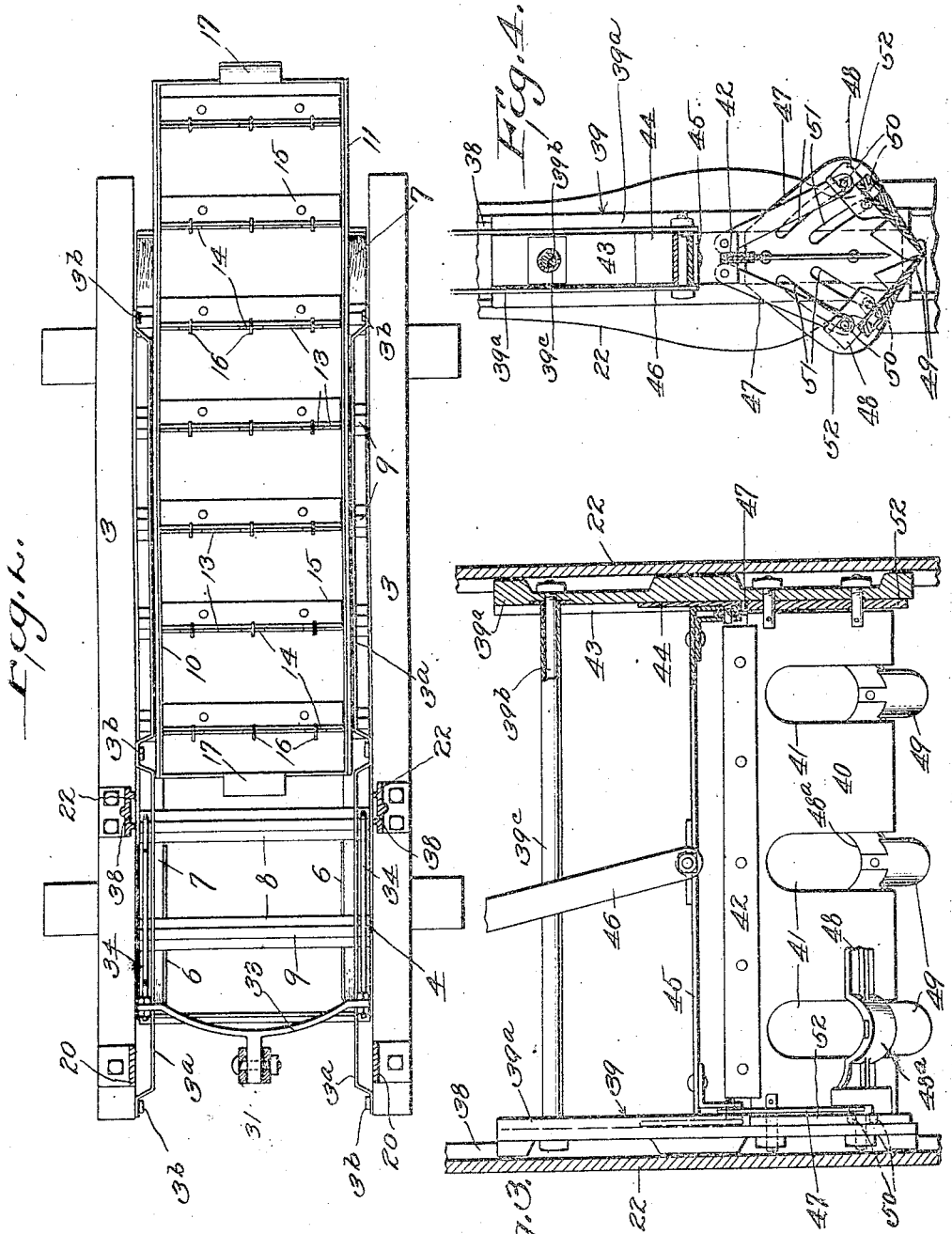

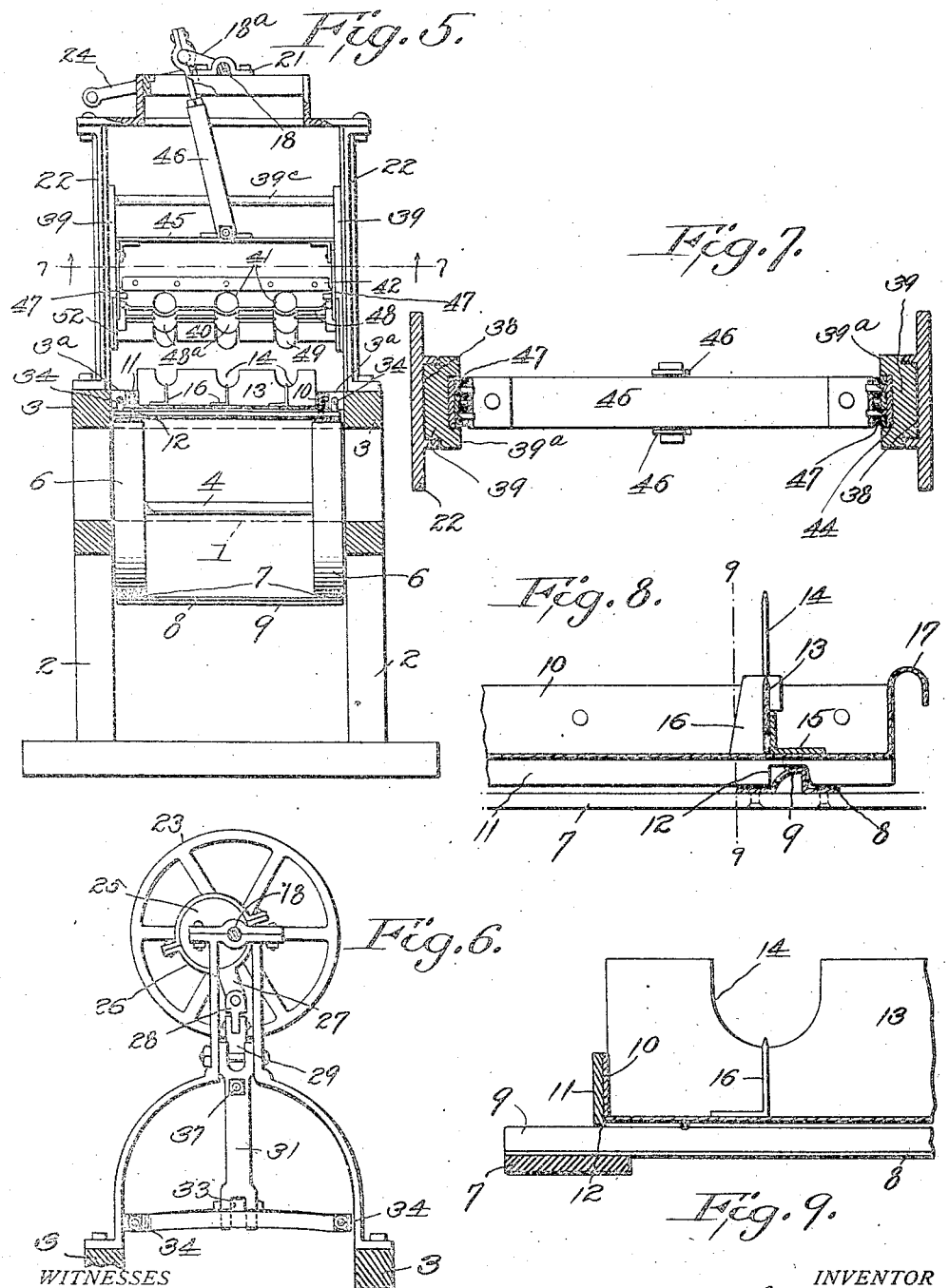

ELIJAH NYSWONGER, OF HANFORD, CALIFORNIA.

CLING-PEACH-PITTING MACHINE.

1,042,590.  Specification of Letters Patent.  Patented Oct. 29, 1912.

Application filed October 25, 1911.  Serial No. 656,582.

*To all whom it may concern:*

Be it known that I, ELIJAH NYSWONGER, citizen of the United States, residing at Hanford, in the county of Kings and State of California, have invented certain new and useful Improvements in Cling-Peach-Pitting Machines, of which the following is a specification.

The present invention relates in general to fruit stoning or pitting devices, and more particularly to an improved machine which is particularly designed for the splitting and pitting of peaches.

The object of the invention is to provide a peach pitting machine which will operate in a quick and effective manner to split the peaches and remove the stones therefrom without unnecessarily mutilating the fruit.

A further object of the invention is to provide a peach pitting machine which is practically continuous in its operation and by means of which large quantities of peaches or similar fruit can be pitted in a comparatively short period of time.

A still further object of the invention is to provide a pitting machine which comprises comparatively few and durable parts such as are not liable to get out of repair, which can be driven with a small amount of power, and which is positive and reliable in its operation.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a peach pitting machine constructed in accordance with the invention, portions being broken away and shown in section. Fig. 2 is a horizontal sectional view on the line 2—2 of Fig. 1. Fig. 3 is an enlarged side elevation of the knife carrying frame upon which the pitting knives are mounted, portions being broken away and shown in section. Fig. 4 is an enlarged transverse sectional view through the knife carrying frame. Fig. 5 is a transverse vertical sectional view through the machine on the line 5—5 of Fig. 1. Fig. 6 is a similar view on the line 6—6 of Fig. 1. Fig. 7 is an enlarged horizontal sectional view on the line 7—7 of Fig. 5. Fig. 8 is an enlarged longitudinal vertical sectional view through one end of the peach carrying tray, and Fig. 9 is a transverse sectional view on the line 9—9 of Fig. 8.

Corresponding and like parts are referred to in the following description and indicated in all the views of the drawing by the same reference characters.

Referring to the drawings, the numeral 1 designates the main frame which is arranged in a substantially horizontal position and is shown as supported by the legs or posts 2. The top of the frame 1 is formed with longitudinal sills 3 which are arranged upon opposite sides of the machine and have a spaced and parallel relation to each other. A transverse shaft 4 is journaled within a suitable bearing 5 at each end of the frame 1, and each of these transverse shafts is provided with a pair of pulleys or wheels 6. Endless belts 7 pass around corresponding pulleys 6 upon the shafts 4, the upper reaches of the said endless belts being received between the sills 3. The two endless belts 7 are connected at regular intervals by transverse slats 8, each of the said slats being formed with an outwardly projecting longitudinal rib 9 having one of the faces thereof inclined or beveled while the opposite face is arranged at substantially right angles to the slat. These transverse slats are conveniently formed of sheet metal, in which instance the ribs 9 can be pressed outwardly therefrom, as indicated more clearly upon Fig. 8 of the drawings.

The endless belts 7 and slats 8 form a carrier upon which fruit carrying trays 10 are adapted to be placed. The sides of these trays 10 extend downwardly below the bottom of the said trays to form the flanges 11 which are suitably notched as at 12 to receive the ribs 9 of the slats 8. It will thus be obvious that when one of these trays is placed upon the upper reach of the endless carrier, as indicated in Figs. 1 and 2, the tray will be advanced with the carrier. Each of the trays 10 is provided with a series of transversely arranged supporting blades 13, the said supporting blades being provided at suitable intervals with the fruit engaging notches 14. These supporting blades 13 may be secured to the bottom of the tray in any suitable manner as by means of the angle strips 15, and longitudinal blades 16 are applied to the notched portions of the transverse blades 13 so as to intersect the bases of the notches and assist in retaining the fruit or peaches against displacement. The end of the tray may be provided with suitable finger pieces such as indicated at 17 for convenience in handling and manipulating the same. These trays constitute the fruit or peach carrying elements and may be constructed to receive any desired number of peaches, depending upon the number of pitting knives mounted upon the machine and the facilities for handling the trays. In the present instance the tray is shown as provided with seven of the transverse positioning blades 13, each of the said blades being provided with three notches 14 and being accordingly adapted to receive three peaches.

A longitudinally disposed drive shaft 18 is mounted over one end of the main frame, the said drive shaft being journaled within a bearing 19 at the upper end of a standard 20, and within the bearings 21 at the top of an upright frame 22. One end of the drive shaft 18 is provided with a pulley 23 adapted to receive power from a suitable source, while the opposite end of the drive shaft is provided with a crank handle 24. It will thus be obvious that the machine may either be driven manually or by some suitable engine or motor.

At a point adjacent the pulley 23 the drive shaft 18 is provided with an eccentric 25 which is engaged by a split ring or eccentric strap 26, the said eccentric strap having an arm 27 pendent therefrom, and the said arm being connected by a knuckle or link 28 to a lever 29 projecting upwardly from a lug 30 upon a swinging arm 31. The standard 20, as shown more clearly in Fig. 6, comprises spaced members which diverge at their lower ends so as to span the width of the frame 1 and be secured at their lower extremities to the respective sills 3. The swinging lever 31 is pendent from a pivot bolt 32 connecting the opposite halves of the standard 20, and with the foregoing construction, it will be obvious that as the shaft 18 is rotated the eccentric 25 will operate through the various connecting elements to swing the lever 31 back and forth. The lower end of the lever 31 is connected to a yoke 33, opposite ends of the yoke being provided with pawls 34 which rest loosely upon the respective belts 7 of the endless carrier. Upon the forward movement of the pawls 34 they slip over the beveled or inclined sides of the ribs 9 projecting from the slats 8 and engage the vertical sides of the said ribs so that upon the return movement of the pawls the endless carrier and fruit tray thereon are advanced. An intermittent or step by step movement is thereby imparted to the endless carrier and fruit tray as the shaft 18 is rotated, the different parts being so proportioned that the various steps bring the supporting blades 13 successively under the pitting knives which are mounted upon the frame 22. The two pawl members 34 are adapted to operate upon opposite sides of the tray 10 and the noses thereof are received between the adjacent sills 3 and guide strips $3^a$ which are spaced from the inner faces of the sills. These guide strips have portions thereof bent inwardly and secured to the sills, as indicated at $3^b$, and the tray 10 is received between the guide strips so as to be held against lateral movement thereby.

For the purpose of enabling the stroke of the swinging lever 31 to be regulated, the lever 29 is shown as adjustably connected to the lug or projection 30. The pin 35 by means of which the lever 29 is secured to the lug 30 may be placed in engagement with any selected one of a series of openings 36, the said lever 29 being held rigidly in position by means of an adjustable brace 37. By moving the pivot pin 35 inwardly toward the lever 31 the stroke of the lever can be decreased, while in a reverse manner by moving the pivot pin outwardly away from the said lever the stroke thereof can be increased.

The frame 22 is formed with spaced side pieces which project vertically upward from the respective sills 3, each of the side pieces being formed upon the inner face thereof with a vertical groove or guideway 38 within which a reciprocating knife carrying frame 39 is mounted. This knife carrying frame comprises a pair of side pieces $39^a$ which are connected at their upper end by a transverse bolt $39^b$ and at the lower end by a blade 40. A sleeve $39^c$ is fitted upon the bolt $39^b$ between the sides $39^a$ so as to hold the said sides in a properly spaced position. The blade 40 corresponds to the positioning blades 13 of the fruit trays and is adapted to coöperate with the said blades to split the peach into two halves. Notches 41 are formed in the lower edge of the blade 40 and register with the notches 14 of the positioning blades 13 when the knife carrying frame is moved downward to bring the blade 40 into engagement with the blade 13. The upper edge of the reciprocating blade 40 is shown as reinforced by a strip 42.

The two sides $39^a$ of the frame 39 are formed upon their inner faces with the vertical grooves 43 receiving the slides 44 which are connected by a cross bar 45, the said cross bar having the middle portion thereof connected by a pitman 46 to a crank portion $18^a$ of the shaft 18. Each of the slides 44 is connected by links 47 to the bars 48 upon which the pitting knives 49 are mounted. These bars 48 are each provided at the opposite ends thereof with a pair of longitudinally projecting pins 50 received within cam slots 51 formed in plates 52 which are rigidly connected to the side pieces of the frame 39 at the lower ends thereof. A pair of the cam slots 51 is formed upon each side of each of the plates, the said cam slots on opposite sides of the plates diverging downwardly. The pitting knives 49 are secured to outwardly curved portions 48ª of the bars 48 and are transversely curved and provided with rounded and sharpened noses which project downwardly below the bars. The corresponding pitting knives upon the two bars 48 are adapted to coöperate with each other, and are directed in their movements by the action of the cam slots 51 upon the pins 50.

As has been previously explained, when the machine is in operation and the drive shaft 18 is rotated, an intermittent or step by step movement is imparted to the endless carrier whereby the blades 13 of the fruit carrying trays are brought successively under the reciprocating splitting blade 40. The crank portion 18ª of the shaft 18 also operates through the pitman 46 to impart a reciprocating up and down movement to the knife carrying frame 39. Upon the upward movement of the pitman 46 the slides 44 are first moved upwardly independently of the frame 39, the upward movement of the said slides operating through the links 47 to draw the knife carrying bars 48 up until the pins 50 engage the upper ends of the slots 51 in the cam plates 52. The pitting knives 49 are thereby moved upwardly and separated so as to have a spaced relation to each other. As soon as the pins 50 engage the upper ends of the slots 51 the frame 39 is raised, the endless carrier being simultaneously advanced one step so as to bring the next positioning blade 13 of the tray under the reciprocating blade 40. Upon the downward movement of the pitman 46 the frame 39 is lowered so as to bring the blade 40 in engagement with the positioning blade 13 and thereby split the peach. As soon as the downward movement of the knife carrying frame 39 is thereby checked, the slides 44 are forced downwardly independently of the frame 39 so as to force the knife carrying bars 48 downwardly. As these knife carrying bars move downwardly the pins 50 travel within the cam slots 51 and direct the motion of the pitting blades 49. These pitting blades are forced downwardly into the peach on opposite sides of the pit and the noses of the said blades are then turned inwardly toward each other and brought together under the pit so as to completely sever the pit from the remainder of the peach. The peaches upon the positioning blade 13 are thereby both split in half and pitted, and upon the upward movement of the knife carrying frame 39 the endless carrier and peach carrying tray are again advanced forward one step so as to bring the peaches upon the next blade 13 in position to be pitted. It is contemplated to employ a number of the trays 10 and to run the same successively through the machine, one or more operators being provided for placing the peaches upon the trays, while another operator will manage the machine and run the trays through the same.

Having thus described the invention, what I claim as new and desire to secure by Letters Patent, is:—

1. In a fruit pitting machine, the combination of a positioning blade adapted to have fruit placed thereon, a reciprocating frame movable toward and away from the positioning blade, a blade upon the reciprocating frame adapted to coöperate with the positioning blade to split the fruit into halves, pitting knives movably mounted upon the reciprocating frame on opposite sides of the blade, means for advancing the pitting knives into the fruit independently of the blade after the blade has reached the limit of its movement, and means for directing the movement of the pitting knives whereby they penetrate the fruit on opposite sides of the pit and are brought together under the pit.

2. In a fruit pitting machine, the combination of a positioning blade adapted to have fruit placed thereon, a reciprocating frame movable toward and away from the positioning blade, a blade upon the reciprocating frame adapted to coöperate with the positioning blade to split the fruit into halves, pitting knives movably mounted upon the reciprocating frame on opposite sides of the blade, means for advancing the pitting knives into the fruit independently of the blade after the reciprocating frame has reached the limit of its movement and come to rest, and cam means for directing the movement of the pitting knives whereby they penetrate the fruit on opposite sides of the pit and are brought together under the pit.

3. In a fruit pitting machine, the combination of a notched positioning blade adapted to have fruit placed thereon with the pit thereof in the notch, a reciprocating frame movable toward and away from the positioning blade, a notched blade upon the reciprocating frame adapted to coöperate with the positioning blade to split the fruit into halves, the notches of the two blades forming a clearance space for the pit of the fruit, pitting knives movably mounted on the reciprocating frame on opposite sides of the frame, means for advancing the pitting knives into the fruit independently of the blade, and cam means for directing the movement of the pitting knives whereby they travel around the pit in a curved path.

4. In a fruit pitting machine, the combination of a fruit supporting element, a reciprocating frame adapted to be moved toward and away from the fruit supporting element, a pair of coöperating pitting knives movably mounted upon the frame, a slide mounted upon the reciprocating frame, an operative connection between the slide and the pitting knives, means for operating the slide and the reciprocating frame, the slide moving independently of the frame after the frame reaches the limit of its movement, and cam means for directing the movement of the pitting knives and causing them to enter the fruit on opposite sides of the pit and travel in a curved path around the pit.

5. In a fruit pitting machine, the combination of a fruit supporting element, a reciprocating frame movable toward and away from the fruit supporting element, coöperating blades upon the fruit supporting element and reciprocating frame for splitting the fruit into halves, a pair of pitting knives movably mounted upon the reciprocating frame, means for operating the reciprocating frame and advancing the pitting knives into the fruit, and cam means for directing the movement of the pitting knives and causing them to enter the fruit on opposite sides of the pit and travel around the pit in a curved path.

6. In a fruit pitting machine, the combination of a notched positioning blade adapted to have fruit placed thereon, a reciprocating frame movable toward and away from the positioning blade, a notched blade upon the reciprocating frame adapted to coöperate with the positioning blade to split the fruit into halves, the notches of the two blades forming a clearance space for the pit of the fruit, a pair of coöperating pitting knives mounted upon the reciprocating frame on opposite sides of the blade, a slide upon the reciprocating frame, an operative connection between the slide and the pitting knives, means for operating the slide and reciprocating frame, the slide moving independently of the reciprocating frame when the reciprocating frame reaches the limit of its movement, and the independent movement of the slide causing the pitting knives to be advanced into the fruit, and cam means for directing the movement of the pitting knives whereby they penetrate the fruit on opposite sides of the pit and travel around the pit in a curved path.

7. In a fruit pitting machine, the combination of a positioning blade provided with a fruit engaging notch, supporting means for the positioning blade, a reciprocating frame, a blade upon the reciprocating frame adapted to coöperate with the positioning blade and split the fruit into halves and provided with a notch adapted to register with the notch of the positioning blade to provide a clearance opening for the pit, plates applied to the reciprocating frame and formed with cam slots, knife carrying bars arranged upon opposite sides of the blade end provided with pins loosely received within the cam slots, pitting knives projecting from the knife carrying bars, a slide mounted upon the reciprocating frame, connecting means between the slide and the knife carrying bars, and means for reciprocating the slide to actuate the reciprocating frame and the pitting knives, the reciprocating frame being moved with the slide after the pins of the knife carrying bars reach the ends of the slots and the movement of the pins within the slots upon the downward movement of the knife carrying bars serving to direct the pitting knives so that they penetrate the fruit on opposite sides of the pit and are brought under the pit.

8. In a fruit pitting machine, the combination of a support, a reciprocating frame, a blade carried by the reciprocating frame, fruit carrying means movably mounted upon the support and provided with a series of fruit positioning blades, means for intermittently advancing the fruit carrying means to bring the various positioning blades successively into coöperative relation to the blade of the reciprocating frame, pitting knives movably mounted upon the reciprocating frame and arranged upon opposite sides of the blade, means for causing the pitting knives to penetrate the fruit when the blade of the reciprocating frame is moved into engagement with the fruit, and means for directing the movements of the pitting knives whereby they penetrate the fruit on opposite sides of the pit and are brought together at the end of the pit.

9. In a fruit pitting machine, the combination of a support, a movable carrier upon the support, a tray adapted to be placed upon the movable carrier and provided with fruit positioning means, a reciprocating frame, means for operating the reciprocating frame and imparting an intermittent movement to the movable carrier whereby the fruit positioning means upon the tray are brought successively opposite the reciprocating frame, and means upon the reciprocating frame for coöperation with the fruit positioning means to cut the fruit into halves and remove the pit therefrom, the carrier being at rest when the cutting means of the reciprocating frame is in operation.

10. In a fruit pitting machine, the combination of a support, a movable carrier mounted upon the support and formed with beveled projections, a tray removably applied to the movable carrier and constructed to interlock therewith, fruit positioning means upon the tray, pawls adapted to engage the beveled projections upon the movable carrier for imparting a step by step movement thereto, means for actuating the pawls, a reciprocating frame, means for operating the reciprocating frame, the said positioning means of the tray being brought successively opposite the reciprocating frame, and means upon the reciprocating frame for coöperation with the fruit positioning means of the tray to split the fruit into halves and remove the pit therefrom, the carrier being at rest when the pitting means of the reciprocating frame is in operation.

11. In a fruit pitting machine, the combination of a support, an endless carrier mounted upon the support and formed with transverse ribs having one side thereof beveled, a tray adapted to be removably applied to the endless carrier and provided at the bottom thereof with notched flanges adapted to engage the said ribs, fruit positioning means upon the tray, a drive shaft, a reciprocating frame, an operative connection between the reciprocating frame and the drive shaft, pawls adapted to engage the beveled ribs of the endless carrier to impart a step by step movement thereto and bring the fruit positioning means of the tray successively opposite the reciprocating frame, an operative connection between the drive shaft and the pawls, and means upon the reciprocating frame for coöperation with the positioning means of the tray to cut the fruit into halves and remove the pit therefrom.

12. In a fruit pitting machine, the combination of a support, a movable carrier upon the support, a tray adapted to be removably applied to the carrier and provided with positioning blades adapted to have fruit placed thereon, a reciprocating frame mounted upon the support and movable toward and away from the carrier, a blade upon the reciprocating frame adapted to coöperate with the positioning blades of the tray to split the fruit into halves, pitting knives mounted upon the reciprocating frame, a drive shaft, an operative connection between the drive shaft and the reciprocating frame and pitting knives, and means actuated by the drive shaft for imparting a step by step movement to the movable carrier whereby the positioning blades of the tray are brought successively into inoperative relation with the blade of the reciprocating frame, the carrier being at rest when the pitting means is in operation.

13. In a fruit pitting machine, the combination of a fruit supporting element, a reciprocating frame adapted to be moved toward and away from the fruit supporting element, plates applied to the reciprocating frame and formed with cam slots, coöperating pitting knives projecting from the knife carrying bars, a slide upon the reciprocating frame, an operative connection between the slide and the knife carrying bars, and means for operating the slide and reciprocating frame, the slide moving independently of the reciprocating frame after the latter has reached the limit of its movement and the pitting knives being thereby caused to penetrate the fruit, the movement of the pins within the cam slots serving to direct the pitting knives whereby they travel in a curved path around the pit.

In testimony whereof I affix my signature in presence of two witnesses.

ELIJAH NYSWONGER.

Witnesses:
J. T. SHORE,
FRANCIS CUNNINGHAM.